Dec. 1, 1936.  B. H. BROWALL  2,062,497
AUTOMATIC SLACK ADJUSTER
Filed July 8, 1935  2 Sheets-Sheet 1

Inventor:
B. H. Browall

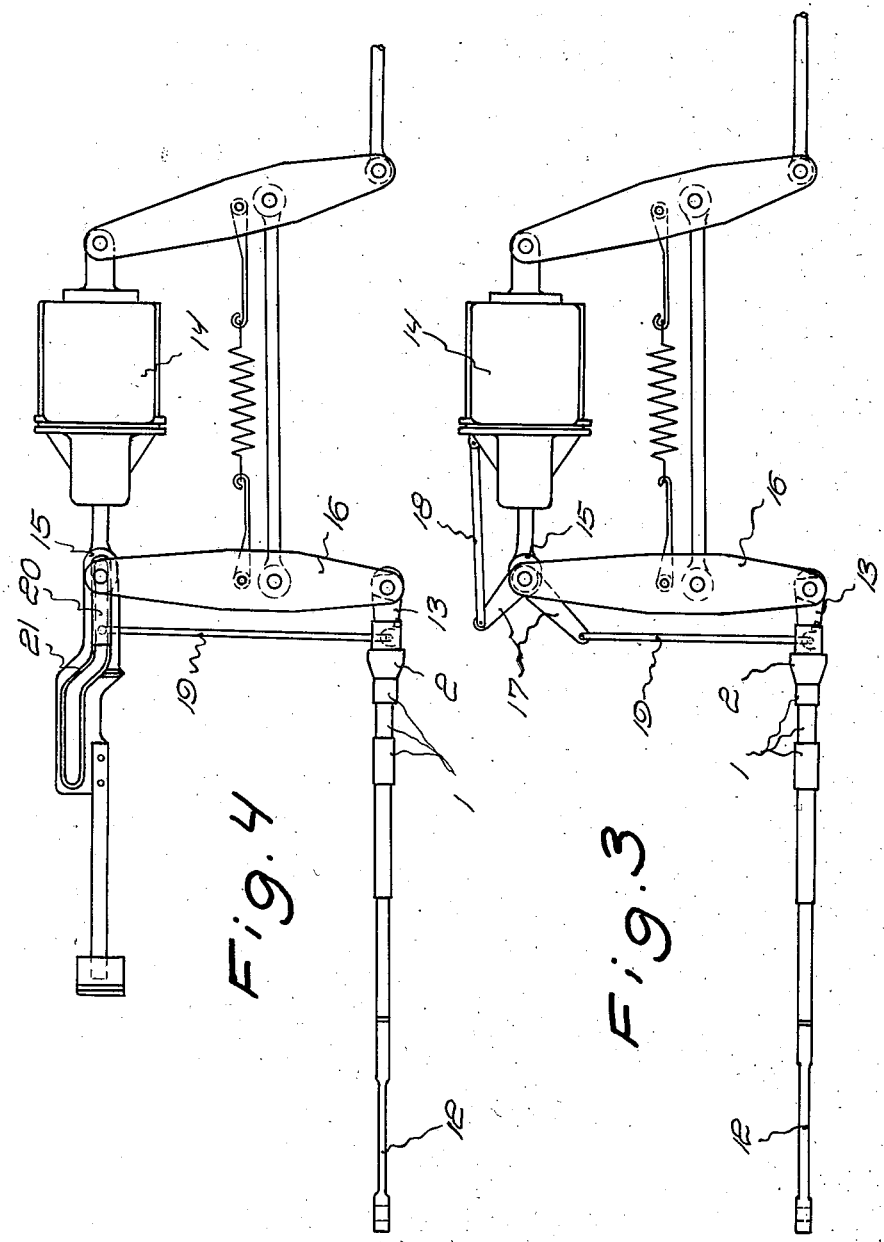

Patented Dec. 1, 1936

2,062,497

UNITED STATES PATENT OFFICE 2,062,497

AUTOMATIC SLACK ADJUSTER

Bert Henry Browall, Malmo, Sweden, assignor to Svenska Aktiebolaget Bromsregulator, Malmo, Sweden, a corporation of Sweden Application July 8, 1935, Serial No. 30,375
In France July 20, 1934

6 Claims. (Cl. 188—202)

This invention relates to automatic slack adjusters for vehicle brakes, especially railway car brakes, of the type including a screw connection which is mounted in the brake rigging connecting the brake shoes to the brake piston and includes a rotatable part which is connected by means of a one-way clutch to a rotatable operating member operatively connected to an actuating device working in dependence upon the travel of the brake piston for rotating the rotatable operating member in one direction at the application of the brake and in the reverse direction at the release of the brake in such a manner that the rotatable part of the screw connection is rotated at the release of the brake in the direction for reducing the slacks if these were too large and, consequently, the brake piston exceeded its normal stroke at the application of the brake.

In known slack adjusters of this type the brake rigging is still under braking tension at the beginning of the rotation of the rotatable part of the screw connection in the direction for reducing the slacks and, therefore, this rotation encounters a great resistance which puts a high strain upon the actuating device until the braking tension in the brake rigging has diminished or disappeared and, moreover, is liable to disturb the release movement of the brake. Certainly, in order to overcome this inconvenience, it has been proposed to construct the slack adjuster so that the slack reducing movement thereof does not take place until near the end of the reverse movement of the actuating device at the release of the brake, when the brake tension in the brake rigging has diminished or disappeared, but then another inconvenience was encountered with, namely that the slack adjuster was liable to effect unintentional and uncontrollable alterations of the slacks under the action of such forces of inertia which result from shocks and the like for instance when switching the cars, and that such unintentional and uncontrollable alterations of the slacks were liable to expose the actuating device to the high strain which it was the purpose to avoid.

The present invention has for its principal object to provide a slack adjuster of the type hereinbefore described, in which the slack reducing movement does not take place until near the end of the reverse movement of the actuating device at the release of the brake and in which all the inconveniences above referred to are done away with so that there is no risk that the slack adjuster shall effect any unintentional and uncontrollable alterations of the slacks under the action of forces of inertia or that any high and undesirable strain shall be put upon the actuating device or that the release movement shall be disturbed on account of the slack adjuster.

According to the invention the connection means between the rotatable part of the screw connection and the rotatable operating member includes, in addition to the one-way clutch hereinbefore mentioned, a device providing between the rotatable part of the screw connection and the rotatable operating member a rotary idle motion of a sufficient order for causing the slack reducing movement of the rotatable part of the screw connection to take place only towards the end of the reverse movement of the actuating device at the release of the brake. Preferably this idle motion shall comprise an angle of rotation, which is of the same or nearly of the same order as the angle through which the rotatable operating member is positively rotated to and fro at the application and the release of the brake, respectively, when the brake piston stroke at the braking operation attains its normal value only. Preferably the idle motion device comprises an intermediate rotatable member interposed between the rotatable part of the screw connection and the rotatable operating member, the idle motion being provided for either between the rotatable operating member and the rotatable intermediate member or between the latter and the rotatable part of the screw connection, while the one-way clutch is arranged between the rotatable part of the screw connection and the rotatable intermediate member or between the latter and the rotatable operating member, respectively.

The invention is illustrated by way of example on the accompanying drawings in which:—

Fig. 3 is a plan view on a smaller scale, illustrating one manner of mounting the slack adjuster in the brake rigging.

Fig. 4 is a view similar to Fig. 3, illustrating another manner of mounting the slack adjuster in the brake rigging.

Figure 1:
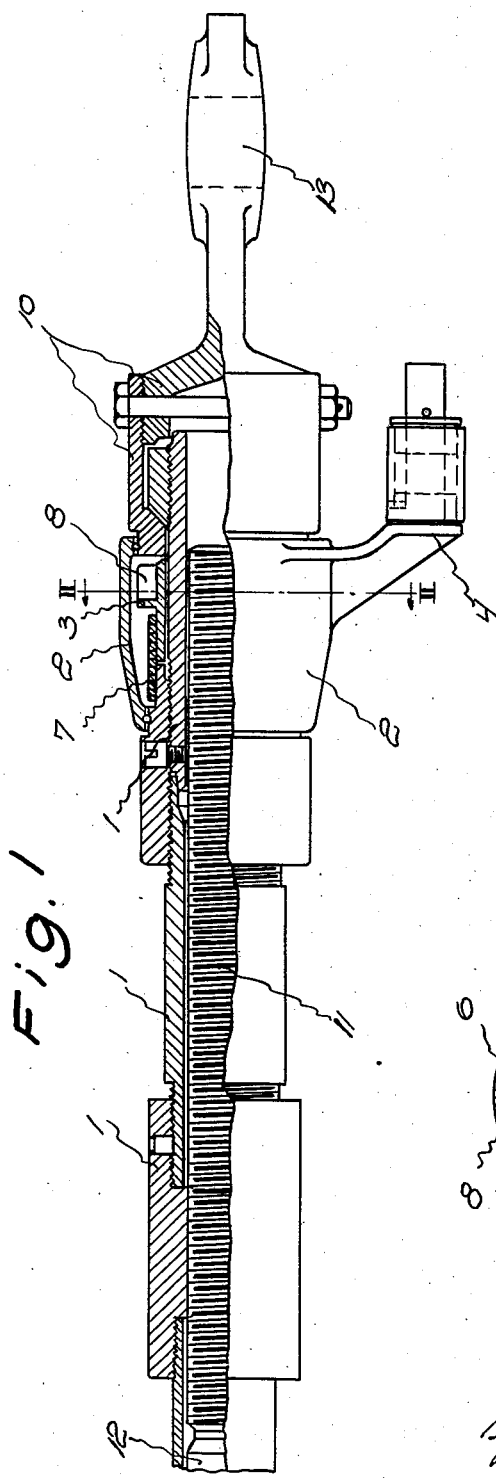
Fig. 1 is a plan view, partially in longitudinal section, of a preferred embodiment of the slack adjuster according to the invention.

Referring to the drawings, the slack adjuster comprises a screw connection which is mounted in the brake rigging and includes a rotatable part 1. A rotatable operating member 2 is arranged concentrically in relation to the rotatable part 1 of the screw connection and is in the form of a casing which is provided with a crank arm 4 by means of which it is connected to an actuating device for positively rotating the operating member to and fro in dependence upon the brake piston travel at the application and the release of the brake, respectively. Also concentrically in relation to the rotatable part 1 of the screw connection and between this part and the rotatable casing 2 there is an intermediate rotatable member 3 in the form of a ring through which the rotation for reducing the slacks is transmitted to the rotatable part 1 of the screw connection from the casing 2. The ring 3 is connected to the housing 2 by means of a pin 5 (Fig. 2) which is provided on the housing 2 and engages a notch 6 in the outer circumference of the ring 3. This notch 6, the ends of which form abutments 8 for the pin 5, has such a length (which may be made adjustable if desired) that the housing 2 can be rotated freely in relation to the ring 3 in both directions through an angle which preferably is of the same or nearly of the same order as the angle through which the housing 2 is rotated to and fro at the application and the release of the brake respectively, when the brake piston stroke at the braking operation only attains its normal value. The rotatable part 1 of the screw connection is connected to the ring 3 by means of a one-way clutch which consists of a coiled spring 7, one half of which fits the ring 3 while the other half fits the part 1 so that the spring in a manner known per se permits free rotation of the ring 3 in relation to the part 1 in one direction, namely the direction in which the housing 2 is rotated at the application of the brake, but clutches the part 1 to the ring 3 when rotating the latter in the other direction, that is the direction in which the housing 2 is rotated at the release of the brake. Preferably, the ring 3 is provided in its outer circumference with a plurality of notches 6 separated by means of equally spaced abutments 8, while the pin 5 on the housing 2 is slidable and kept in its active position by a spring 9 (Fig. 2), so that the pin 5 can be pulled out of its active position for permitting free rotation of the ring 3 in relation to the housing 2 and for enabling reengagement of the pin 5 with any one of the notches 6. Due to the symmetrical arrangement of the abutments 8 and the notches 6 around the axis of the screw connection such forces of inertia which result from shocks or the like for instance when switching the cars cannot cause any such rotation of the ring as could give rise to unintentional or uncontrollable operation of the slack adjuster.

Figure 2:
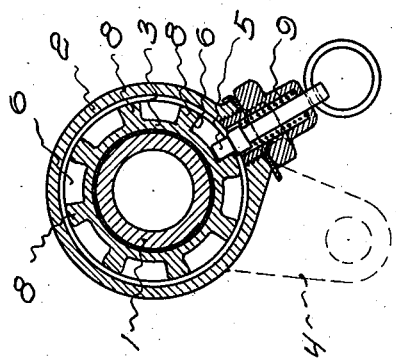
Fig. 2 is a cross sectional view on the line II—II of Fig. 1.

The arrangement shown in Figs. 1 and 2 is an example of a preferred constructional form of the slack adjuster according to the invention. The rotatable part 1 consists of a sleeve which at one of its ends is rotatably but not slidably fitted in a head 10 and at its other end is secured to a nut which is screwed on a threaded end portion 11 of a pull-rod 12. The other end of this pull-rod 12 is connected to the beams for the actuation of the brake shoes as usual, while the head 10 is provided with a fastening-ear 13, by means of which the pull-rod is connected to the brake lever.

Two examples of known forms of the actuating device are shown in Figs. 3 and 4, in which 14 designates the brake cylinder and 15 the head of the brake piston-rod to which the brake-lever 16 is operatively connected. In the embodiment according to Fig. 3 there is pivoted on the head of the piston-rod 15 a bell crank lever 17 having one of its arms connected to a fixed point by means of a link rod 18, while the other arm of the bell crank lever 17 is connected by means of a link rod 19 to the crank-arm 4 provided on the housing 2. In the embodiment according to Fig. 4 the crank-arm 4 is connected by means of the link rod 19 to an arm 20 which is pivoted on the head of the piston-rod 15 and guided by a slotted guiding plate 21.

The slack adjuster is shown on the drawings in its normal position at released brake. At the application of the brake the actuating device rotates the housing 2 in one direction, and at the release of the brake the actuating device rotates the housing 2 in the reverse direction back to normal position. If the amplitude of this rotation at normal value of the brake piston travel corresponds to the amplitude of the idle motion between the casing 2 and the ring 3, the latter remains in its position as long as the brake piston stroke does not exceed the normal value. However, if it happens that the brake piston stroke at any braking operation exceeds the normal value, the housing 2 is rotated beyond the idle motion in relation to the ring 3 and, in turn, rotates the latter through a certain angle. When this happens, the ring 3 is held in its new position in relation to the rotatable part 1 by means of the initial friction between the clutch spring 7 and the parts 1, 3. During the reversed rotation of the housing 2 at the release of the brake the housing is first moved over the idle motion between the same and the ring 3, before it, towards the end of the brake releasing movement when the brake tension in the brake rigging has disappeared, rotates the ring 3 in the slack reducing direction through an angle just as great as the angle through which the ring 3 was rotated at the application of the brake. At the rotation of the ring 3 in this direction the spring 7 is active, so that the rotatable part 1 of the screw connection is caused to partake in this rotation, whereby the slacks are reduced in order to readjust the brake piston stroke to normal value.

Through a suitable adjustment of the length and initial friction of the clutch spring 7 it is possible to enable the spring 7 to slide at the slack reducing movement if the latter for one reason or the other encounters too great a resistance, and this possibility represents an additional advantage of the invention. Further the invention is advantageous also for the reason that the slack reducing movement takes place in a more uniform manner independently of the type of the actuating device used, either this device works during the full piston stroke, as according to Fig. 3, or only during a certain part of the piston stroke, as according to Fig. 4.

What I claim and desire to secure by Letters Patent is:—

1. An automatic slack adjuster for vehicle brakes, especially railway car brakes, which include a brake piston, brake shoes and a brake rigging connecting the brake shoes to the brake piston, comprising in combination a screw connection which is adapted to be mounted in the brake rigging and includes a rotatable part, an operating member which is rotatable about the axis of the screw connection and is adapted to be rotated positively in dependence upon the brake piston travel in one direction at the application of the brake and in the reverse direction at the release of the brake, means connecting the rotatable part of the screw connection to the rotatable operating member and comprising a one-way clutch capable of transmitting rotation in slack reducing direction to the rotatable part of the screw connection from the operating member when the latter is rotated in the aforesaid reverse direction and, in addition to said one-way clutch, a device providing between the rotatable part of the screw connection and the rotatable operating member a rotary idle motion of a sufficient order for causing the slack reducing movement of the rotatable part of the screw connection to take place only towards the end of the reverse movement of the operating member at the release of the brake.

2. In a vehicle brake, especially a railway car brake, including a brake piston, brake shoes and a brake rigging connecting the brake shoes to the brake piston, an automatic slack adjuster comprising a screw connection which is mounted in the brake rigging and includes a rotatable part, a rotatable operating member arranged concentrically in relation to the axis of said screw connection, an actuating device operatively connected to the brake piston and adapted to rotate the said operating member in dependence upon the travel of the brake piston in one direction at the application of the brake and in the reverse direction at the release of the brake, and means connecting the rotatable part of the screw connection to the operating member and comprising a one-way clutch capable of transmitting rotation in slack reducing direction to the rotatable part of the screw connection from the operating member when the latter is rotated in the aforesaid reverse direction and, in addition to said one-way clutch, a device providing between the rotatable part of the screw connection and the rotatable operating member a rotary idle motion of a sufficient order for causing the slack reducing movement of the rotatable part of the screw connection to take place only towards the end of the reverse movement of the actuating device at the release of the brake.

3. In an automatic slack adjuster as claimed in claim 2 the additional feature that the said rotary idle motion comprises an angle of rotation, which is of substantially the same order as the angle through which the rotatable operating member is positively rotated to and fro at the application and the release of the brake, respectively, when the brake piston stroke at the braking operation attains its normal value only.

4. An automatic slack adjuster as claimed in claim 1, in which the idle motion device includes an intermediate rotatable member interposed between the rotatable part of the screw connection and the rotatable operating member, and in which one of the two parts identified as the rotatable part of the screw connection and the rotatable operating member is connected to the said intermediate rotatable member by means of the one-way clutch, while the rotary idle motion is provided for between the intermediate member and the other one of aforesaid two parts.

5. An automatic slack adjuster as claimed in claim 1, in which the rotary idle motion device includes a rotatable ring concentrically arranged in relation to the axis of the screw connection and provided on its outer circumference with a plurality of notches separated by abutments equally spaced about the axis of the ring, and in which the operating member is in the form of a rotatable housing enclosing said ring and carrying a pin which is engageable with any one of said notches in said ring, the said ring being connected to the rotatable part of the screw connection by means of the one-way clutch.

6. An automatic slack adjuster as claimed in claim 1, in which the rotary idle motion device includes an intermediate rotatable member between the rotatable part of the screw connection and the rotatable operating member, and in which the one-way clutch connects the intermediate rotatable member with one of the two rotatable parts identified as the rotatable part of the screw connection and the operating member and comprises a coiled one-way frictional clutch spring capable of sliding at the slack reducing movement if this encounters too great a resistance, while at the same time the initial frictional engagement of the clutch spring is sufficient for enabling the clutch spring to hold the intermediate rotatable part in its position at the rotation of the operating member over the idle motion.

BERT HENRY BROWALL.